Figure 1:
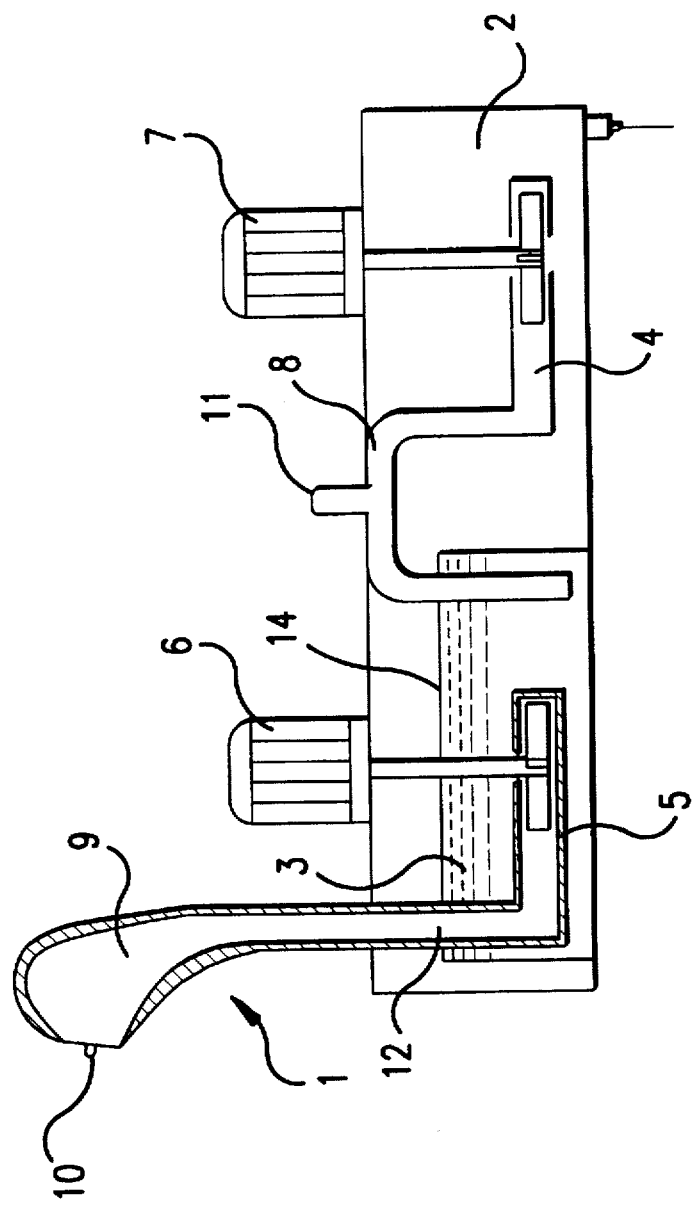

United States Patent [19]
Schroeder

[11] Patent Number: 5,787,943
[45] Date of Patent: Aug. 4, 1998

[54] PROCESS AND DEVICE FOR DOSING FREE-FLOWING MEDIA

[75] Inventor: Wolfgang Schroeder, Magdeburg, Germany

[73] Assignee: AFUEMA Abfuellmaschinen GmbH Rosslau, Rosslau, Germany

[21] Appl. No.: 732,414

[22] PCT Filed: Feb. 20, 1996

[86] PCT No.: PCT/DE96/00338

§ 371 Date: Oct. 22, 1996

§ 102(e) Date: Oct. 22, 1996

[87] PCT Pub. No.: WO96/26111

PCT Pub. Date: Aug. 29, 1996

[30] Foreign Application Priority Data

Feb. 22, 1995 [DE] Germany ............... 195 07 817.9

[51] Int. Cl.⁶ ............... B65B 1/30; B65B 3/28; B65B 57/06; B65B 57/14
[52] U.S. Cl. ............... 141/198; 141/67; 141/94; 141/192; 141/196; 222/59; 222/64
[58] Field of Search ............... 141/1, 2, 67, 83, 141/94, 198, 196, 192; 222/59, 63, 64; 417/43

[56] References Cited

U.S. PATENT DOCUMENTS 5,316,444  5/1994  Wicnienski .................. 417/2

FOREIGN PATENT DOCUMENTS

| 0426266 | 5/1991 | European Pat. Off. . |
|---|---|---|
| 0444269 | 9/1991 | European Pat. Off. . |
| 284453 | 11/1990 | Germany . |
| 297123 | 1/1992 | Germany . |
| 19507817 | 8/1996 | Germany . |
| 9202787 | 2/1992 | WIPO . |

Primary Examiner—Henry J. Recla
Assistant Examiner—Timothy L. Maust
Attorney, Agent, or Firm—Jordan and Hamburg

[57] ABSTRACT

A procedure and a device for dosing free-flowing media irrespective of its viscosity into containers. It is based on the task of providing an inventive solution for filling machines of the procedure, allowing the dosing of free-flowing media into containers within an exact time regime. The task is solved by the filling media moving through the filling pump, flowing passed a flow sensor in a filling media flow, with the flow speed being measured and transmitted to a regulator in which the set value is stored which is then compared with the actual value measured in the flow sensor. To adapt the actual value to the set value, the output of the filling pump is changed until the actual and set values of the flow speed correspond. With the thus exactly determined flow speed, the filling flow of the filling media arrives at the starting sensor arranged at the outlet opening of the filling pipe and activates the sensor by flowing through a sensor section. The starting sensor is connected to a counter, counting time cycles via a time interval, thus enabling the time control of the filling volume.

5 Claims, 3 Drawing Sheets

PROCESS AND DEVICE FOR DOSING FREE-FLOWING MEDIA

The invention refers to a procedure for the dosed filling of free-flowing media into containers in which the time for filling the volume of a filling pipe is measured and in which the set comparison brings this time into a determined time relation with the volume of a vessel to be filled. For this purpose, the time for filling the filling pipe is divided into time units, commencing with the start of the filling and finishing with the emergence of the medium from the filling pipe. The basis for filling the volume of the filling pipe is maintained constant by the overflow arrangement of a leveling container. The viscosity adjustment is carried out separately outside of the filling pipe. The invention furthermore provides a device for implementing the procedure.

DD PS 297 123 shows that the base for filling the volume of the filling pipe of a flow-controlled filling machine for products of any viscosity is kept constant by the overflow arrangement of a leveling container. For this purpose, a filling machine is designed in such a way that the filling pipe emerges from a buffer container in which a leveling container is arranged and in which the filling pipe connected to a pump ends in a filling medium bath. The leveling container contains a mutual filling medium bath maintained in a continuous circuit due to continuous overflowing of the filling medium from the leveling container. At the rising end of the filling pipe, a barrier consisting of sensors is formed which is connected by a control signal to a control device, which in turn is connected to a pump via an output signal provided and amplified before a switching amplifier. Via a control signal, the control device is in operative connection with a position transmitter. The known procedure and the device have the disadvantage that dosing is volume-dependent. This requires a readjustment of the equipment during the filling process, in particular in case of viscosity deviations and varying densities of the filling medium. Furthermore it should be pointed out that inaccuracies of the dosed volume are or disadvantage due to the idling times of the volume control.

The invention thus has the task of providing a procedure and a device according to the characterizing clauses of claims 1 and 4, enabling an exact, automatically controlled dosing of free-flowing media into respective containers.

According to the invention, the task for a generic procedure is solved by the characterizing features of claim 1 and for a generic device implementing the procedure by the characterizing features of claim 4.

After switching the filling pump off, the filled vessel moves on and the time-controlled filling process in the filling cycle starts again. It is a characteristic of the inventive procedure that the total filling time—$t_n$—is determined in corporation with the factors of

- the volume—V—of the filling medium to be filled into the container
- the speed—v—of the filling medium when passing the sensor at the outlet opening of the filling pipe
- —A—as cross-sectional area of the filling pipe with the formula $$t_n = \frac{V}{v \cdot A}$$

A further advantageous characteristic of the inventive solution is that the flow speed Qv in the filling pipe is measured by an analogue speed sensor. Upon reaching the sensor arranged at the outlet opening, the filling time is started and is, in context with the now constant flow speed Qv and the constant volume of the filling medium, finished once the container has been filled. In an embodiment of the inventive solution, a filling pipe always filled to the same level with filling medium is arranged on the leveling container connected to a filling pump. The filling pipe contains a flow sensor arranged directly above the level of the filling medium in the leveling container and is connected to an SPS-type time control. The time control contains the set value of the flow speed of the filling medium. By using a constant comparison of the set and actual values of the flow speeds, the actual speed is adapted to the set value size. This adaptation is carried out by changing the pump speed, giving off a different volume and consequently readjusting the flow speed of the filling medium whilst maintaining the constant conditions such as the same cross section of the filling pipe. In a further development of the inventive solution, the starting sensor arranged at the outlet opening of the filling pipe is activated when the filling flow passes the sensor area. As the factors, flow speed and volume for a time unit are constant as is the cross-section of the filling pipe, only the time in which a certain volume is filled into the container needs to be measured. The time control process of free-flowing media according to the procedure and adapted for the device has the advantage of providing an absolute exact volume. As the medium has a constant even viscosity character due to its preparation, a continuous flow speed is guaranteed during the filling of a container. Due to the cyclic repeating and self-controlling nature of the filling process, the system offers the advantage of always filling exactly the same amount of filling medium into the containers to be filled, as the measuring accuracy parameters can always be repeated.

The invention is explained in detail below with reference to the respective illustration in which:

FIG. 1: Shows the implementation of the procedure when used for filling media with a shear ratio.

Figure 2:
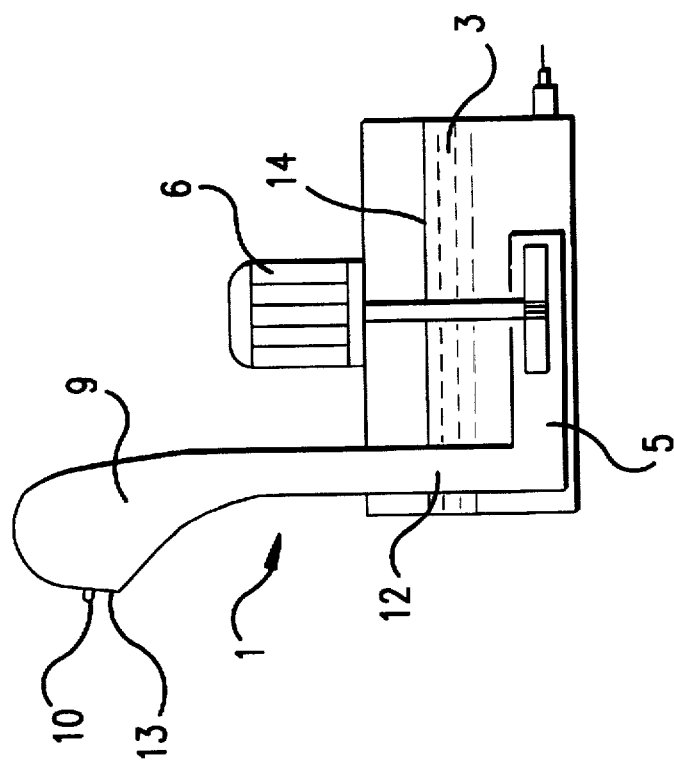

FIG. 2: Shows the implementation of a procedure when used for filling media without a shear ratio.

Figure 3:
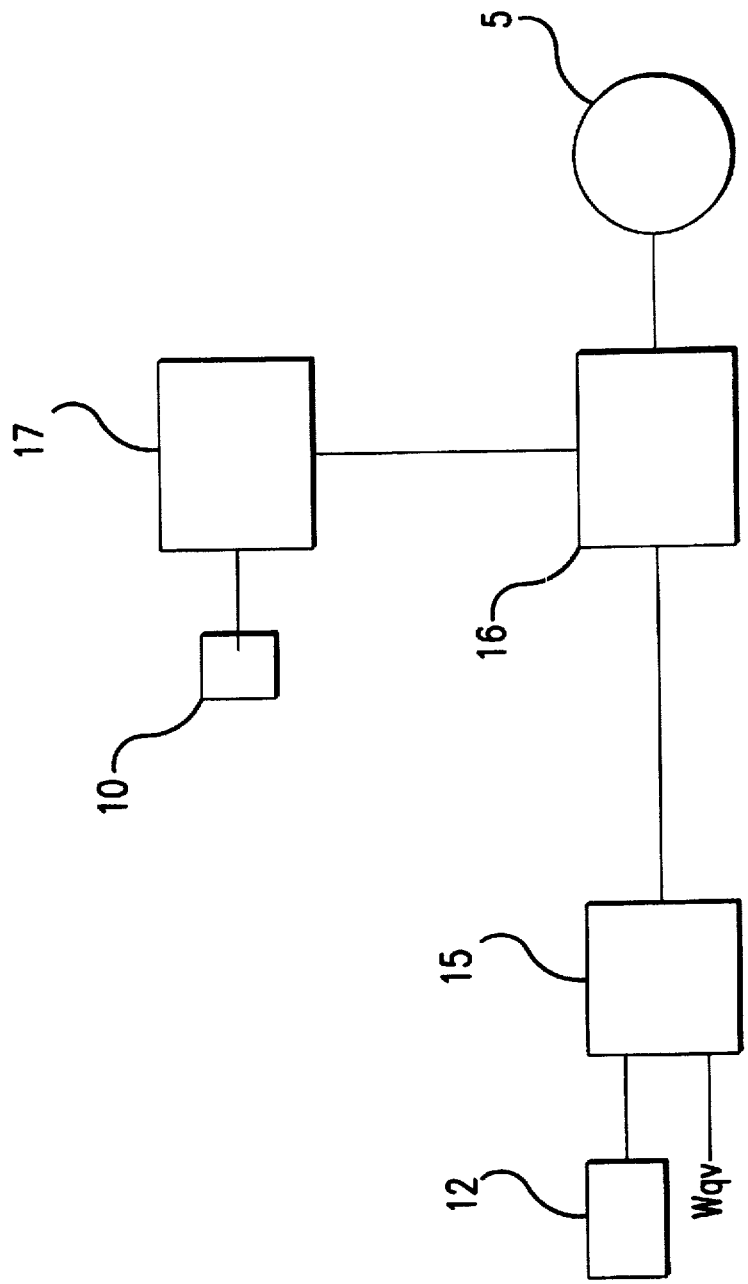

FIG. 3: Is an illustration of the procedural sequence according to FIGS. 1 and 2.

FIG. 1 shows an automatic filler 1 comprising a buffer container 2, a leveling container 3, a leveling pump 4 with a connected pressure pipe 8 at the base of the leveling container 3, a filling pump 5 with a connected rising filling pipe 9 in which an analogue speed sensor 12 is arranged directly above the liquid level 14 and a start sensor 10, is arranged at the outlet end.

The outlet end of the rising filling pipe 9 is designed in such a way that the filling jet of the medium to be filled flows freely and safely into the filling opening of the vessel to be filled, thus guaranteeing a clean filling without subsequent dripping.

Consequently the flow sensor 11 for measuring the flow speed Qv is arranged on the pressure pipe 8 as shown in FIGS. 1 and 3. The flow sensor 11 continuously measures the flow speed Qv. The measuring value Xqv is entered into a Qv regulator 15 as an actual value of the flow speed Qv and is compared with a set value Wqv. In case of corresponding set and actual values no change is made in a frequency converter 16 and no speed change in the leveling pump 4. If the set and actual values in the SPS device differ, a voltage signal Uqv is issued as a regulated quantity of the Qv regulator to the frequency converter 16 and the speed of the leveling pump 4 is changed until the required flow speed Qv has been reached. This ensures a high constance of the filling pump output level. When the filling is started, the analogue speed sensor 12 measures the rise of the flow speed in the rising filling pipe 9. At the same time, the measured actual values are continuously compared with the set values stored in the Qv regulator 15. If the set value of the flow speed in the rising filling pipe 9 has been reached, the speed of the filling pump 5 is kept constant by frequency converter 16. The arrangement of the sensor 12 directly above the liquid level 14 was chosen to allow detection of die filling medium speed directly after switching on the pump operation of the filling pump 5. Once the set value speed has been reached, the value is kept constant at all times. In order to assure a certain adjustment of the rising filling medium speed in the filling pipe 9, the length of the filling pipe 9 is arranged in such a way that the set speed of the filling medium flow is reached before the filling medium emerges from the filling pipe 9 at the start sensor 10. If the filling medium flows from the filling pipe 9, it enters the operative range and activates the start sensor 10. Once the sensor 10 has been activated, a fast counter 17 is started. The counter 17 is set to switch off pump 5 upon reaching a stipulated volume depending on the time, unit. It is therefore not a volume dosing but a filling stream flow speed, accurately adjusted due to the constant filling pipe cross section and corresponding to a set value as well as a specified filling volume, determined by the respective size of the container to be filled. Due to the accurate control of the filling time, an extraordinary high accuracy of the volume is achieved. From the constant filling pipe cross section of the controlled filling medium speed in context with the volume to be filled, the following formula for the calculation is determined:

$$t_n = \frac{V}{v \cdot A} \; [s].$$

With the symbols having the following meaning:
$t_n$ = total filling time [s]
V = stipulated volume [cm$^3$]
v = speed V [cm$^{-1}$]
A = cross-sectional area of the filling pipe [cm$^2$]

From the speed control of the medium flow the following procedural steps result:

1. The speed of the filling jet is automatically regulated by the speed measurement, resulting in a filling, free from subsequent dripping or spraying.
2. The exactness of the filling is increased, as the automatic speed control achieves a higher constance of the filling volume.
3. The system prevents an incorrect filling which could occur due to the incorrect manual input of values for the frequency converter 16.

According to FIG. 1 the leveling pump 4 is started after switching on the volume filling unit upon completion of the filling process of the buffer container 2. The volume flow generated by the leveling pump 4 fills the leveling container 3, arranged in the buffer container 2. The volume flow generated in the leveling pump 4 effects a continuous overflowing of the product to be filled on all sides of the leveling container 3, arranged in the buffer container 2. The leveling container 3 is arranged in such a way, that the medium overflows on all sides. Directly above the level of the leveling container 3 an analogue flow sensor 12 is arranged on the rising filling pipe 9. The sensor 12 is designed to measure flow speeds in the range of 0–300 cm/s. The speed sensor 12 continuously measures, as shown in FIG. 3, the actual value of the flow speed Xqv, which is compared with the stipulated flow speed set value Wqv in the Qv regulator 15. The measuring value Xqv is an analogue voltage value, accepting voltages of 0–10 V depending on the speed. All analogue voltages are assigned to a flow speed. Upon activation, the filling pump 5 generates a volume flow and increases the volume flow relative to the speed. The specified set value (speed set value Wqv) is 1.5 m/s. The voltage compensation is carried out in the Qv regulator 15 after FIG. 3. For this purpose a voltage value of i.e. 5 V is emitted to the frequency converter (FU 1) and the output frequency is increased in such a way that the speed of the filling pump 5 is increased to the required final speed of 900 rpm. The filling pipe 5 also compensates for the apparent increase of the geodetic lift height in the filling pipe 9 for higher densities, so that the flow speed Qv is always fulfilled in the set value Wqf. This compensation is required as a volume flow Q of at least 1 l/s is generated with a selected pump output and an existing filling pipe cross section. The final speed of the filling pump 5 is reached at the selected frequency converter 16 after approx. 0.1 s. The start sensor 10 may only be activated once the filling pump 9 is securely operating in the range of the constant adjusted flow speed. The starting sensor 10 is thus arranged above the filling level of the leveling container 14 in such a way that the covered distance certainly suffices for adjusting the speed. The sensor 10 is only activated once no more speed changes of the filling stream Q can take place.

The arrangement according to FIGS. 1 and 3 is selected for filling viscous filling medium with a shear ratio. Dispersions have a defined shear ratio. An example for this are latex binding agents, whose viscosity is in this case decreased by agitation from an initial value of, for instance, 10 000 mPas to a viscosity value of approx. 1 000 mPas. If the agitation is stopped, the viscosity value rapidly increases again. The viscosity therefore increases again in the filling pump 5 during the filling breaks and the standstill of the pump runners. To prevent a viscosity rise, the pump 5 is set directly after the pump standstill to a speed not transporting any medium. The level difference between the leveling container 3 and the filling product level in the buffer container 2 is generally 2 to 3 cm. A higher volume flow Q can thus be generated with the same leveling pump 4 running at a lower speed. When filling medium without a shear ratio, the overflow arrangement according to FIG. 1 is not required as no viscosity changes are caused by the agitation.

FIGS. 2 and 3 serve to explain the associated procedural system in more detail. According to FIG. 2, the filling pump 5 is directly arranged in the buffer container 2. The filling pipe 9 contains a flow sensor 12 and above it, in rising direction, a start sensor 10.

As shown in FIG. 2, the flow sensor 12 measures the actual flow speed of the filling flow Q, generated by the filling pump 5. In the Qv regulator 15, the measured flow speed is compared with the set value Wqv. The formed regulated quantity Uqv is output directly to the frequency converter 16 of the filling pump 5. The distance between the sensors 12 and start sensor 10, measuring the flow, is selected in such a way that a controlled constant flow according to the set/actual value comparison and the set value as well as a change of the pump speed is achieved before the activation of the start sensor 10. For this purpose it should be observed, that a separate level control for maintaining a constant level in the buffer container 2 is ensured. This controls that a predetermined filling speed is achieved and no level fluctuations leading to a change in the flow speed Qv occur. At the start of the filling, the sensor 12 measures the actual flow speed generated by the filling pump 5. The sensor 12 is connected to a Qv regulator 15. The set value of the flow speed Qv is stored in the Qv regulator 15.

The actual values of the flow speed Xqv, determined by the flow sensor 12, are transferred to the Qv regulator 15, where they are compared with the set values Wqv. The comparison is carried out until the size of the constantly detected actual values is adjusted to the set value Wqf by the increased pump output of the filling pump. The adjustment is in any case concluded before the filling media reaches the start sensor 10 in the filling pipe. Upon the filling media passing the start sensor 10, it is activated and gives off a pulse to a counter, measuring the time pulses until the specified volume has been filled into the container. After expiry of the time interval for filling the filling volume, the counter issues a command to the frequency converter 16, stopping the filling pump 5. To fill the next container, the same timing is used. The time required to fill a 1000 ml container is approx. 1.4 s so that in one minute approx. 30 containers of the specified size can be filled, allowing also for container change time.

Listing of the Referential Characters Used

1 Automatic filling
2 Buffer container
3 Leveling container
4 Leveling pump
5 Filler pump
6;7 Motor
8 Pressure pipe
9 Filling pipe
10 Start sensor
11;12
13 Outlet opening
14 Level
15 Qv regulator
16 Frequency converter
17 Counter
Q Filler flow
Qv Flow speed
Xqv Actual value of flow speed
Wqv Set value of flow speed
Uqv Regulated quantity

I claim:

1. A procedure for the dosed filling of free-flowing media, irrespective of its viscosity, into containers in which the time for filling the volume of a filling pipe is measured and is brought by the set comparison into a time-determined relation with the volume of a vessel to be filled, in which the time for filling the filling pipe is divided into time units, commencing with the start of the filling and ending with the medium emerging from the filling pipe, in which the basis for filling the volume of the filling pipe is kept constant by an overflow arrangement of a leveling container and the viscosity is separately adjusted outside of the filling pipe, characterized in that, the filling medium moved through the filling pipe flows past a flow sensor in a filling media flow from which its flow speed (Qv) is measured and transmitted to a Qv regulator, where the measured actual value is continuously compared with a set value of the flow speed (Qv) stored in the regulator and is adapted until the set value is reached, in which the adjustment of the flow speed (Qv) to the set value is concluded before the filling flow arrives at the outlet opening and upon a filling jet emerging from the filling pipe it flows past a sensor arranged at the outlet opening of the filling pipe, touching the sensor area and activating the sensor, through which a pulse is issued to a counter for counting time pulses, through which a pulse is transferred to a frequency converter, establishing the time, which in turn switches off the filling pump upon reaching a time limit corresponding exactly to the filling quantity of the filling medium in the filled container.

2. A procedure according to claim 1, characterized in that, the total filling time ($t_n$) is determined in cooperation with the factors of the filling volume—V—of the filling media to be filled into the container; the flow speed of the filling media when passing the sensor at the outlet opening of the filling pipe and—A—, the cross-sectional area of the filling pipe in the formula $$t_n = \frac{V}{v \cdot A} \ [s].$$

3. A procedure according to claim 1, characterized in that, the flow speed (Qv) in the filling pipe is measured with an analogue speed sensor and upon reaching the sensor arranged at the outlet opening of the filling pipe, the counting of the filling time being started and terminated in combination with the now constant flow speed (Qv) and constant filling medium upon the complete filling of a container.

4. A device for implementing the procedure according to one of the claims 1 to 3, including a device for setting up and moving vessels as well as filling and dosing devices in which a filling pipe rises out of a buffer container in which a leveling container is arranged, from which the filling pipe, connected to a pump, submerged in a filling media bath, rises up, in which the leveling container contains a mutual filling medium bath with the buffer container and maintains a continuous circuit with a filling medium bath through even overfilling of the leveling container and with a barrier formed by sensors being formed at the end of the filling pipe which can be connected to a control device via a control signal and which is connected to the pump via an output signal before the switching amplifier, in which the control device is operatively connected to a position transmitter via a control signal, characterized in that, the filling pipe (9) is arranged at the leveling container (3), filled with the filling medium at a continuous even level (14) and connected to the filling pump (5) and with a flow sensor (12) being arranged in the filling pipe (9) above the level (14) of the filling media and being connected with a known SPS device, storing a set value of the flow speed (Qv), the actual value of the flow speed (Qv) measured by the sensor (12) being adapted in a constant set/actual value comparison by the time control up to reaching a starting sensor (10) arranged at the outlet opening (13) of a filling pipe (9) and the actual value of the flow speed (Qv) being adapted to the set value and the starting sensor (10) connected to the counter via a time control being activated by an emerging filling jet and coming into operative contact with the filling pump through a frequency conversion at the end of the filling time and consequently switching off the filling pump.

5. A device according to claim 4 characterized in that, the starting sensor (10) is arranged directly in front of the outlet opening (13) of the filling pipe (10).

* * * * *